3,290,300
HYDRAZONES OF 1-AMINO-4-DIBENZO-CYCLOHEPTENYLPIPERAZINES

John W. Cusic, Skokie, and Peter Yonan, Chicago, Ill., assignors to G. D. Searle & Co., Chicago, Ill., a corporation of Delaware
No Drawing. Filed Apr. 27, 1964, Ser. No. 362,929
1 Claim. (Cl. 260—240)

The present invention relates to a novel group of compounds which are hydrazones derived from 1-amino-4-dibenzocycloheptenylpiperazines and aromatic aldehydes or ketones. More particularly, it relates to compounds having the following general formula

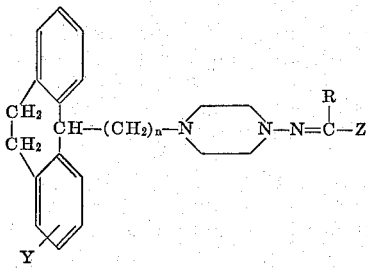

wherein Y is selected from the group consisting of hydrogen, methyl, and halogen; $n$ is a whole number between 0 and 1 inclusive; Z is phenyl, substituted phenyl, pyridyl, substituted pyridyl, or ferrocenyl; R is selected from the group consisting of hydrogen and methyl.

Thus, Z can represent phenyl, tolyl, halophenyl, hydroxyphenyl, methoxyphenyl, methylenedioxyphenyl, cyanophenyl, ferrocenyl, pyridyl, methylpyridyl, 1-oxidopyridyl, and 1-oxidomethylpyridyl. A particularly preferred embodiment of this invention are those compounds wherein R is hydrogen and Z is pyridyl, methylpyridyl, or the N-oxides of these pyridyl radicals.

The halogens referred to above include fluorine, chlorine, bromine, and iodine. The halophenyl radicals referred to above include fluorophenyl, chlorophenyl, bromophenyl, and iodophenyl.

The compounds of the present invention are useful because of their anti-convulsant properties. In particular, they are inhibitors of pentylenetetrazol-induced convulsions. In addition, they antagonize electroshock seizures and seizures produced by strychnine. Anti-ulcer activity is also a property of the present compounds; those compounds wherein Z is ferrocenyl are particularly useful for this purpose.

The organic bases of this invention form non-toxic acid addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention are conveniently prepared by the condensation of an aldehyde or ketone with a hydrazine of the following general structure

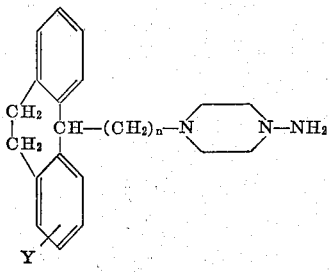

wherein $n$ and Y are defined as above. The reaction is conveniently carried out in an inert solvent. That is, the reaction is carried out in a solvent which will not react with the aldehydes, ketones, or hydrazines used. Useful solvents for this reaction are alcohols such as ethanol and 2-propanol and aromatic hydrocarbons such as benzene and toluene. The reaction can optionally be carried out in the presence of a small amount of acid which serves to promote the reaction. Acetic acid is an example of an acid useful for this purpose.

Although aldehydes and ketones are the most convenient starting materials for use in this reaction, carbonyl derivatives are also useful. For example, it is possible to use acetals, ketals, diacetates, and other carbonyl derivatives which can be readily converted to carbonyl compounds in the reaction mixture. Nitrones, which can be converted to carbonyl compounds in the reaction mixture, are also useful. Particularly useful in this regard are compounds such as N-(4-dimethylamino-phenyl)-α-(N-oxidopyridyl)nitrones.

The following examples are presented to further illustrate the present invention; they should not be construed as limiting it in spirit or in scope. In these examples, quantities are indicated in parts by weight unless parts by volume are indicated and temperatures in degrees centigrade (° C.). The relationship between parts by volume and parts by weight is the same as that between milliliters and grams.

Example 1

A mixture of 23 parts of 5-chloro-10,11-dihydro-5H-dibenzo[a,d]cycloheptene, 12 parts of 1-nitrosopiperazine, 20 parts of potassium carbonate, 5 parts of sodium iodide, and 320 parts of 2-butanone is stirred and refluxed for 16 hours. The resultant mixture is filtered to remove salts and the solvent is evaporated from the filtrate under reduced pressure. The resultant residue is dissolved in chloroform and the chloroform solution is washed with water and dried and the solvent is evaporated under reduced pressure to leave a crystalline residue. Ether is added to this residue which is then filtered. The product obtained in this way is 1-(10,11-dihydro-5H-dibenzo-[a,d]cyclohepten-5-yl)-4-nitrosopiperazine and it melts at about 193–194° C. after recrystallization from a mixture of chloroform and ether.

A solution of 21 parts of the above nitroso compound in 280 parts of hot tetrahydrofuran is added portionwise, with stirring, to a suspension of 8 parts of lithium aluminum hydride in 420 parts of tetrahydrofuran. This addition is carried out over a period of 1 hour at a temperature of 40–45° C. The mixture is then heated for 2 hours at 45–50° C. before it is cooled in an ice bath and decomposed by the cautious dropwise addition of water. The reaction mixture is filtered to remove precipitated salts and the solvent is evaporated from the filtrate to leave a residual solid which is mixed with ether and then filtered. The product thus obtained is 1-(10,11-dihydro-5H-dibenzo[a,d]cyclohepten-5-yl) - 4-aminopiperazine and it melts at about 145–146° C. after recrystallization from a mixture of chloroform and hexane. This compound has the following formula

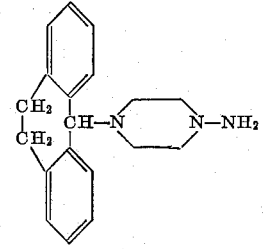

If an equivalent quantity of 3,5-dichloro-10,11-dihydro-5H-dibenzo[a,d]cycloheptene is substituted for the 5-chloro-10,11-dihydro-5H-dibenzo[a,d]cycloheptene in the procedure described in the preceding two paragraphs, there is first obtained 1-(3-chloro-10,11-dihydro-5H-dibenzo[a,d]cyclohepten-5-yl)-4-nitrosopiperazine which is then reduced to give 1-(3-chloro-10,11-dihydro-5H-dibenzo[a,d]cyclohepten-5-yl)-4-aminopiperazine.

Likewise, the reaction of 2-methyl-5-chloro-10,11-dihydro-5H-dibenzo[a,d]cycloheptene with 1-nitrosopiperazine according to the procedure described in the first two paragraphs first gives 1-(2-methyl-10,11-dihydro-5H-dibenzo[a,d]cyclohepten-5-yl)-4-nitrosopiperazine and then, on reduction, 1-(2-methyl-10,11-dihydro-5H-dibenzo[a,d]cyclohepten-5-yl)-4-aminopiperazine.

Example 2

A solution is prepared from 17 parts of 10,11-dihydro-5H-dibenzo[a,d]cycloheptene - 5 - carbonyl chloride, 250 parts of chloroform, and 37 parts of triethylamine. To this solution there is added, portionwise with stirring, a solution of 8 parts of 1-nitrosopiperazine in 37 parts of chloroform. The resultant mixture is refluxed for 2 hours and then washed with water and dried. The solution is concentrated to a low volume, ether is added, and the ether solution is cooled to give 1-(10,11-dihydro-5H-dibenzo[a,d]cycloheptene-5-carbonyl)-4-nitrosopiperazine melting at about 177–179° C. after recrystallization from a mixture of chloroform and ether.

A solution of 14 parts of the above nitroso compound in 210 parts of hot tetrahydrofuran is added portionwise to a suspension of 10 parts of lithium aluminum hydride in 700 parts of tetrahydrofuran. The addition is carried out with stirring at a temperature of about 45° C. The mixture is then heated for an additional 2 hours at 45° C. before it is cooled in an ice bath and decomposed by the cautious addition of water. The mixture is filtered to remove the salts, the filtrate is dried, and the solvent is evaporated from the filtrate to give 1-(10,11-dihydro-5H-dibenzo[a,d]cyclohepten-5-ylmethyl) - 4-aminopiperazine.

Example 3

A solution is prepared from 4 parts of 1-(10,11-dihydro-5H-dibenzo[a,d]cyclohepten-5-yl)-4-aminopiperazine, 40 parts of 2-propanol, 2 parts of piperonal, and 1 drop of glacial acetic acid. The solid which precipitates from the solution is 1-(10,11-dihydro-5H-dibenzo[a,d]cyclohepten-5-yl)-4-piperonylidene-aminopiperazine and it melts at about 196–197° C. after recrystallization from a mixture of chloroform and hexane. This compound has the following formula

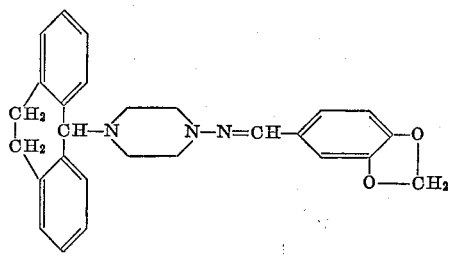

Example 4

If an equivalent quantity of benzaldehyde is substituted for the piperonal and the procedure of Example 3 is repeated, the product is 1-(10,11-dihydro-5H-dibenzo[a,d]cyclohepten-5-yl)-4-benzylidene-aminopiperazine.

Likewise, substitution of 4-hydroxybenzaldehyde for the piperonal of Example 3 gives 1-(10,11-dihydro-5H-dibenzo[a,d]cyclohepten - 5 - yl) - 4 - (4 - hydroxybenzylideneamino)piperazine.

In the same manner, substitution of 4-cyanobenzaldehyde for the piperonal of Example 3 gives 1-(10,11-dihydro - 5H - dibenzo[a,d]cyclohepten - 5 - yl) - 4 - (4-cyanobenzylideneamino)piperazine.

Example 5

Pyridine-2-carboxaldehyde is reacted with 1-(10,11-dihydro - 5H - dibenzo[a,d]cyclohepten - 4 - yl)-4-aminopiperazine according to the procedure described in Example 3. In this case, the product obtained is 1-(10,11-dihydro - 5H - dibenzo[a,d]cyclohepten - 5 - yl) - 4 - (2 - pyridylmethyleneamino)piperazine. This compound melts at about 225–227° C.

If pyridine-3-carboxaldehyde is used in the above reaction, the product obtained is 1-(10,11-dihydro-5H-dibenzo[a,d]cyclohepten - 5 - yl) - 4 - (3 - pyridylmethyleneamino)piperazine. This compound melts at about 166–167° C. after recrystallization from a mixture of chloroform and hexane.

In the same manner, if an equivalent quantity of pyridine-4-carboxaldehyde is used as the carbonyl component of the reaction mixture, the product obtained is 1-(10,11-dihydro - 5H - dibenzo[a,d]cyclohepten - 5 - yl) - 4 - (4-pyridylmethyleneamino)piperazine melting at about 205–207° C. This compound has the following formula

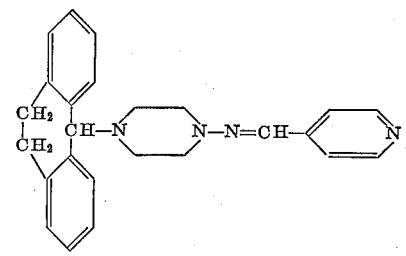

Example 6

Pyridine-4-carboxaldehyde is reacted with 1-(2-methyl - 10,11 - dihydro - 5H - dibenzo[a,d]cyclohepten - 5-yl) - 4 - aminopiperazine according to the procedure described in Example 3. In this case, the product is 1-(2-methyl - 10,11 - dihydro - 5H - dibenzo[a,d]cyclohepten-5-yl)-4-(4-pyridylmethyleneamino)piperazine.

In the same manner, the reaction of pyridine-4-carboxaldehyde with 1 - (3 - chloro - 10,11 - dihydro - 5H - dibenzo[a,d]cyclohepten - 5 - yl) - 4 - aminopiperazine gives 1 - (3 - chloro - 10,11 - dihydro - 5H - dibenzo[a,d]cyclohepten - 5 - yl) - 4 - (4 - pyridylmethyleneamino)piperazine. This compound has the following formula

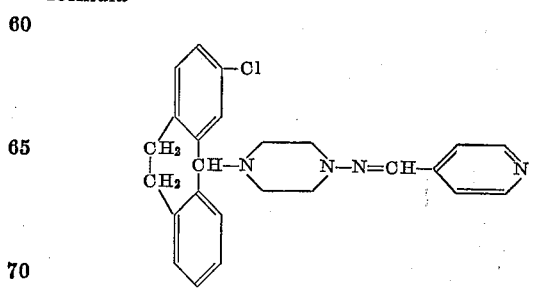

Example 7

The reaction of 4-acetylpyridine with 1-(10,11-dihydro-5H - dibenzo[a,d]cyclohepten - 5 - yl) - 4 - aminopiperazine according to the procedure described in Example 3 gives 1 - (10,11 - dihydro - 5H - dibenzo[a,d]cyclohepten - 5 - yl) - 4 - [α - (4 - pyridyl)ethylideneamino]piperazine melting at about 149–150° C. after recrystallization from hexane.

Likewise, reaction of 6-methylpyridine-2-carboxaldehyde with the same hydrazine gives 1-(10,11-dihydro-5H-dibenzo[a,d]cyclohepten - 5 - yl) - 4 - (6 - methyl - 2-pyridylmethyleneamino)piperazine.

Example 8

Pyridine-4-carboxaldehyde is reacted with 1-(10,11-dihydro - 5H - dibenzo[a,d]cyclohepten - 5 - ylmethyl) - 4-aminopiperazine according to the procedure described in Example 3. In this case, the product obtained is 1-(10,11 - dihydro - 5H - dibenzo[a,d]cyclohepten - 5 - ylmethyl)-4-(4-pyridylmethyleneamino)piperazine.

Example 9

5 parts of N-(4-dimethylaminophenyl)-α-(1-oxido-4-pyridyl)nitrone is slurried with 25 parts of water and then acidified with 25 parts by volume of 3 N hydrochloric acid. An additional 10 parts of water is added to the mixture. Then, a solution of 5.7 parts of 1-(10,11-dihydro - 5H - dibenzo[a,d]cyclohepten - 5 - yl) - 4-aminopiperazine in 15 parts by volume of 3 N hydrochloric acid is added to the mixture. A yellow precipitate forms. This is separated by filtration and washed with cold water. The solid is then slurried in water and benzene and the mixture is made neutral with dilute potassium carbonate solution. The benzene layer is then separated, washed with water, and dried, and the solution is concentrated to a small volume at reduced pressure. Ether is added to the resultant concentrate which is then cooled to give crystals of 1-(10,11-dihydro-5H-dibenzo-[a,d]cyclohepten - 5 - yl) - 4 - [(1 - oxido - 4 - pyridyl) methyleneamino]piperazine. This compound melts at about 189–190° C. and it has the following formula

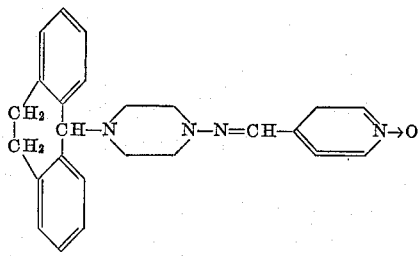

Using the appropriate nitrone, an analogous product can be obtained having a 1-oxidomethylpyridine group in place of the 1-oxidopyridyl structure in the compound described above.

Example 10

An equivalent quantity of ferrocenecarboxaldehyde is substituted for the piperonal and the procedure of Example 3 is repeated. The product obtained in this way is 1-(10,11-dihydro-5H-dibenzo[a,d]cyclohepten-5-yl)-4-ferrocenylmethyleneaminopiperazine which melts at about 159–160° C. after recrystallization from hexane. This compound has the following formula

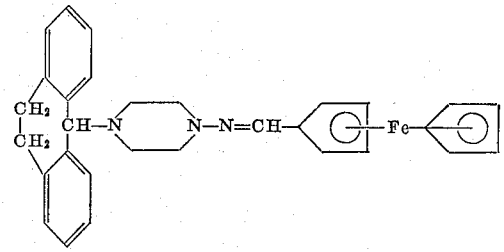

What is claimed is:
1 - (10,11 - dihydro - 5H - dibenzo[a,d]cyclohepten-5-yl)-4-ferrocenylmethyleneaminopiperazine.

No references cited.

JOHN D. RANDOLPH, *Primary Examiner.*